(12) United States Patent
Roos et al.

(10) Patent No.: US 7,966,873 B1
(45) Date of Patent: Jun. 28, 2011

(54) SYSTEMS AND METHODS FOR PROVIDING A SEVERE ACOUSTIC, THERMAL, AND AIRFLOW TEST ENVIRONMENT

(75) Inventors: Howard Norman Roos, St. Louis, MO (US); Matthew Paul Kardell, Maryland Heights, MO (US)

(73) Assignee: The Boeing Company, Chicago, IL (US)

( * ) Notice: Subject to any disclaimer, the term of this patent is extended or adjusted under 35 U.S.C. 154(b) by 95 days.

(21) Appl. No.: 12/609,243

(22) Filed: Oct. 30, 2009

(51) Int. Cl.
*G01M 9/00* (2006.01)
(52) U.S. Cl. .......................................................... 73/147
(58) Field of Classification Search ........................ None
See application file for complete search history.

(56) References Cited

U.S. PATENT DOCUMENTS 3,381,897 A * 5/1968 Wennerstrom ............. 239/127.1
3,613,444 A * 10/1971 Grunwald et al. .............. 73/147

OTHER PUBLICATIONS

Creech, G.; Space Shuttle Return to Flight Gets a "Lift" from NASA Dryden F-15B; Dryden News; http://www.nasa.gov; Feb. 22, 2005; 2 sheets.
NASA F-15 us Used to Test X-33 Tiles; http://www.flightglobal.com; Apr. 17, 1996; 1 sheet.
Two Panels of Space Shuttle TPS Insulation were Mounted on the Flight Test Fixture Underneath NASA's F-15B during the Lifting Foam Trajectory Flight Test Series; http://www.dfrc.nasa.gov; Feb. 16, 2005; 2 sheets.

* cited by examiner

*Primary Examiner* — Andre J Allen
(74) *Attorney, Agent, or Firm* — Armstrong Teasdale LLP

(57) ABSTRACT

A system for simultaneously creating severe acoustic, thermal and airflow environmental conditions is described. The system includes a jig for mounting a test article, a jet engine, and a nozzle attached to the jet engine. The nozzle includes an opening for defining a two dimensional exhaust flow from the jet engine to create an acoustical, thermal and airflow environment across the test article. The jig is operable for maintaining a position of the test article with respect to the nozzle.

20 Claims, 7 Drawing Sheets

SYSTEMS AND METHODS FOR PROVIDING A SEVERE ACOUSTIC, THERMAL, AND AIRFLOW TEST ENVIRONMENT

BACKGROUND

The field of the invention relates generally to providing a test environment for certain structural components, materials, and coatings, and more specifically to systems and methods for providing a severe acoustic, thermal, and airflow test environment.

Development and certification of advanced structural components, materials and coatings, which must survive extreme acoustic, thermal and airflow environments is difficult and expensive due to lack of adequate and affordable extreme environment testing facilities and methods.

Specifically, there are no known existing laboratory-scale solutions, which combine the three environments of acoustic levels, temperature, and airflow at extreme levels. Stand-alone laboratory acoustic testing machines are known, as are stand-alone thermal testing machines. In addition there are known solutions for combined acoustic and thermal testing. However, and as stated above, there are no known laboratory test capabilities which combine control of all three environments, acoustic, temperature, and airflow simultaneously.

The exiting solutions involve using large-scale wind tunnels capable of supersonic speeds, and the operation of actual air or space vehicles. As a specific example, NASA performed tests on the space shuttle thermal protection system tiles by attaching them to the outside structure of an F-15 jet and conducting test flights at supersonic speeds in order to expose the tiles to the right combination of extreme acoustic levels, extreme thermal conditions, and extreme airflow environments.

As described above, existing laboratory-scale solutions are only partial and incomplete since they do not include all three environments in combination. The problem with test solutions that incorporate either a supersonic wind tunnel and/or air/space vehicles is primarily complexity and cost. Supersonic wind tunnels, for example, are very expensive to operate; on the order of $15,000 per hour plus setup costs. NASA space shuttle tile tests on the F-15 jet are estimated to cost on the order of $25,000 to $50,000 per flight.

Evaluations of new structural, material and/or coating concepts, which need to survive hundreds of hours in the severe environments, is generally cost prohibitive using either wind tunnel or air/space vehicle test options. A further disadvantage of either of these options is operational and flight safety risk assessments. Specifically, a significant risk analysis is required to install any new components and/or materials in either a supersonic wind tunnel or on an air/space vehicle.

BRIEF DESCRIPTION

In one aspect, a system for simultaneously creating severe acoustic, thermal and airflow environmental conditions is provided. The system includes a jig for mounting a test article, a jet engine, and a nozzle attached to the jet engine. The nozzle includes an opening for defining a two dimensional exhaust flow from the jet engine to create an acoustical, thermal and airflow environment across the test article. The jig is operable for maintaining a position of the test article with respect to the nozzle.

In another aspect, a method for placing a test article into a severe acoustic, thermal and airflow environment is provided. The method includes placing the test article onto a jig, aligning the test article with a nozzle attached to a jet engine, the nozzle having an opening for defining a two dimensional exhaust flow from the jet engine, and operating the jet engine to create the desired severe acoustical, thermal and airflow environment about the test article.

In another aspect, an assembly for directing an exhaust flow from a jet engine is provided. The assembly includes a transition assembly comprising a body extending between a first end and a second end, the body transitioning from a round cross-section at the first end configured for attachment to a jet engine to a rectangular cross-section at the second end. The assembly also includes a nozzle assembly comprising a rectangular flange for attachment to the rectangular cross section of the transition assembly, a generally U-shaped member extending from the rectangular flange which defines a bottom and opposing sides of the nozzle assembly, and a member defining an arcuate surface which forms a top of the nozzle assembly. The member is attached to the opposing sides, with the arcuate surface defining a portion of the two dimensional exhaust flow from the jet engine.

The features, functions, and advantages that have been discussed can be achieved independently in various embodiments of the present invention or may be combined in yet other embodiments, further details of which can be seen with reference to the following description and drawings.

DETAILED DESCRIPTION

The described embodiments are directed to a laboratory test machine that incorporates in one specific embodiment, a modified jet engine and a specially designed exhaust nozzle. The two in combination are utilized to create an environment that includes simultaneous extreme acoustic loads, high temperatures and high speed airflow environments. In at least one application, the embodiments are directed to development and certification testing of advanced structural components, materials and coatings, which during actual use can be expected to be exposed to a combined environment of extreme acoustic, thermal and airflow conditions.

Figure 1:
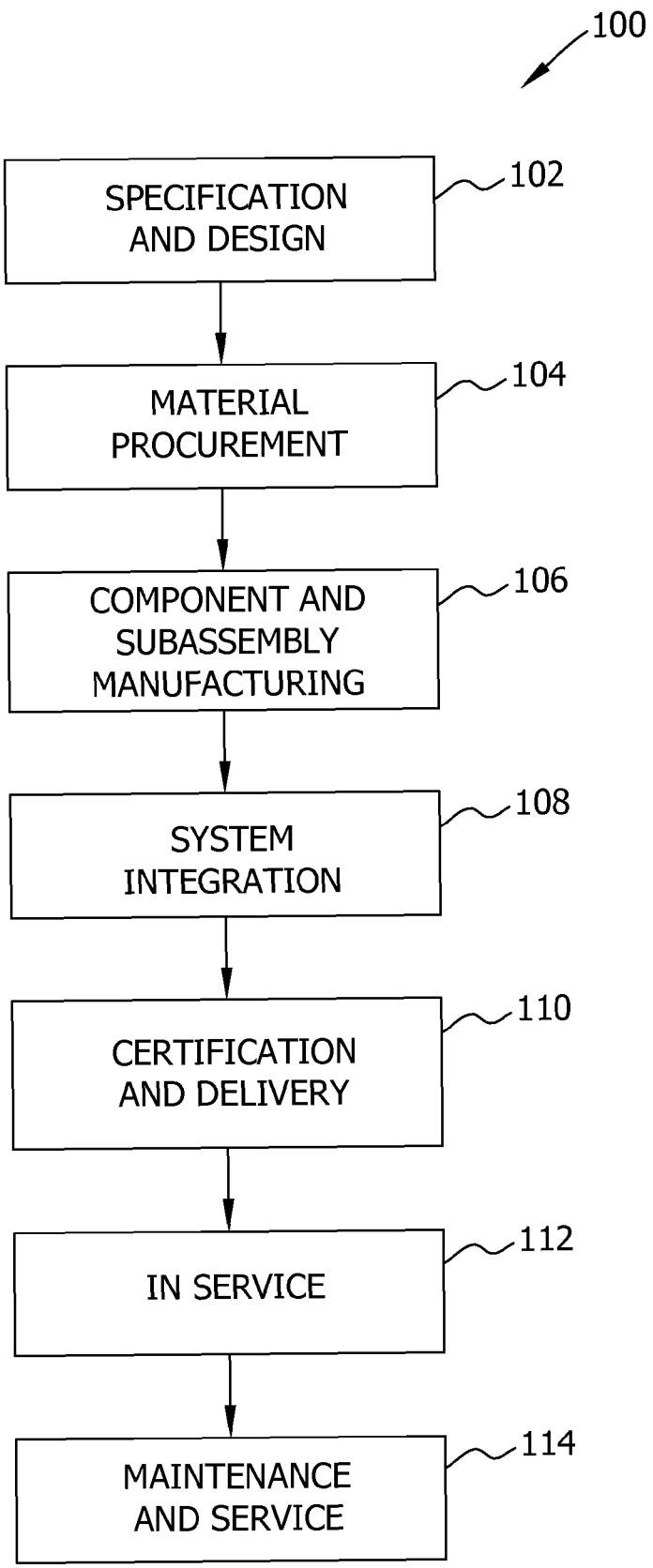
FIG. 1 is a flow diagram of an aircraft production and service methodology.
Figure 2:
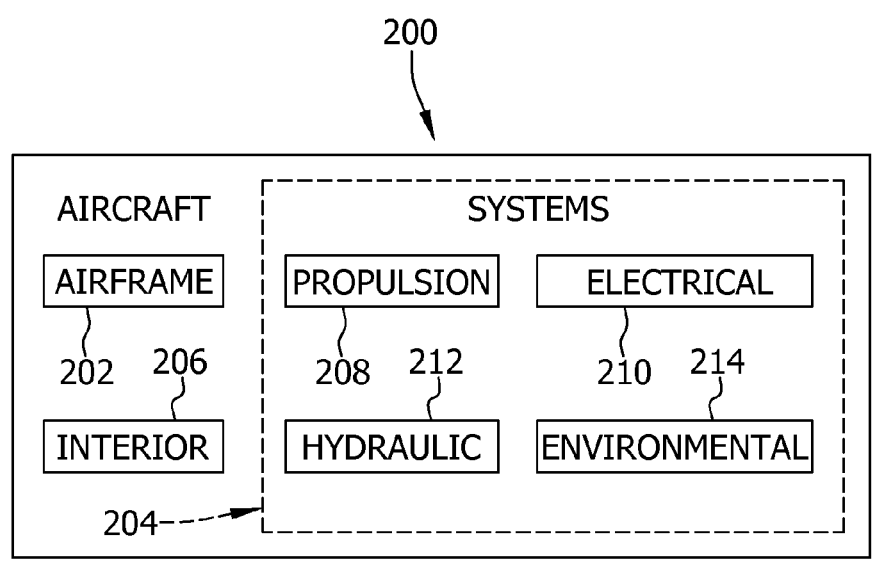
FIG. 2 is a block diagram of an aircraft.

Referring more particularly to the drawings, embodiments of the disclosure may be described in the context of aircraft manufacturing and service method 100 as shown in FIG. 1 and an aircraft 200 or other extreme environment vehicle as shown in FIG. 2. During pre-production, aircraft manufacturing and service method 100 may include specification and design 102 of aircraft 200 and material procurement 104.

During production, component and subassembly manufacturing 106 and system integration 108 of aircraft 200 takes place. Thereafter, aircraft 200 may go through certification and delivery 110 in order to be placed in service 112. While in service by a customer, aircraft 200 is scheduled for routine maintenance and service 114 (which may also include modification, reconfiguration, refurbishment, and so on).

Each of the processes of aircraft manufacturing and service method 100 may be performed or carried out by a system integrator, a third party, and/or an operator (e.g., a customer). For the purposes of this description, a system integrator may include, without limitation, any number of aircraft manufacturers and major-system subcontractors; a third party may include, for example, without limitation, any number of venders, subcontractors, and suppliers; and an operator may be an airline, leasing company, military entity, service organization, and so on.

As shown in FIG. 2, aircraft 200 produced by aircraft manufacturing and service method 100 may include airframe 202 with a plurality of systems 204 and interior 206. Examples of systems 204 include one or more of propulsion system 208, electrical system 210, hydraulic system 212, and environmental system 214. Any number of other systems may be included in this example. Although an aerospace example is shown, the principles of the disclosure may be applied to other industries, such as the automotive industry.

Apparatus and methods embodied herein may be employed during any one or more of the stages of aircraft manufacturing and service method 100. For example, without limitation, components or subassemblies corresponding to component and subassembly manufacturing 106 may be fabricated or manufactured in a manner similar to components or subassemblies produced while aircraft 200 is in service.

Also, one or more apparatus embodiments, method embodiments, or a combination thereof may be utilized during component and subassembly manufacturing 106 and system integration 108, for example, without limitation, by substantially expediting assembly of or reducing the cost of aircraft 200. Similarly, one or more of apparatus embodiments, method embodiments, or a combination thereof may be utilized while aircraft 200 is in service, for example, without limitation, to maintenance and service 114 may be used during system integration 108 and/or maintenance and service 114 to determine whether parts may be connected and/or mated to each other.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

Figure 3:
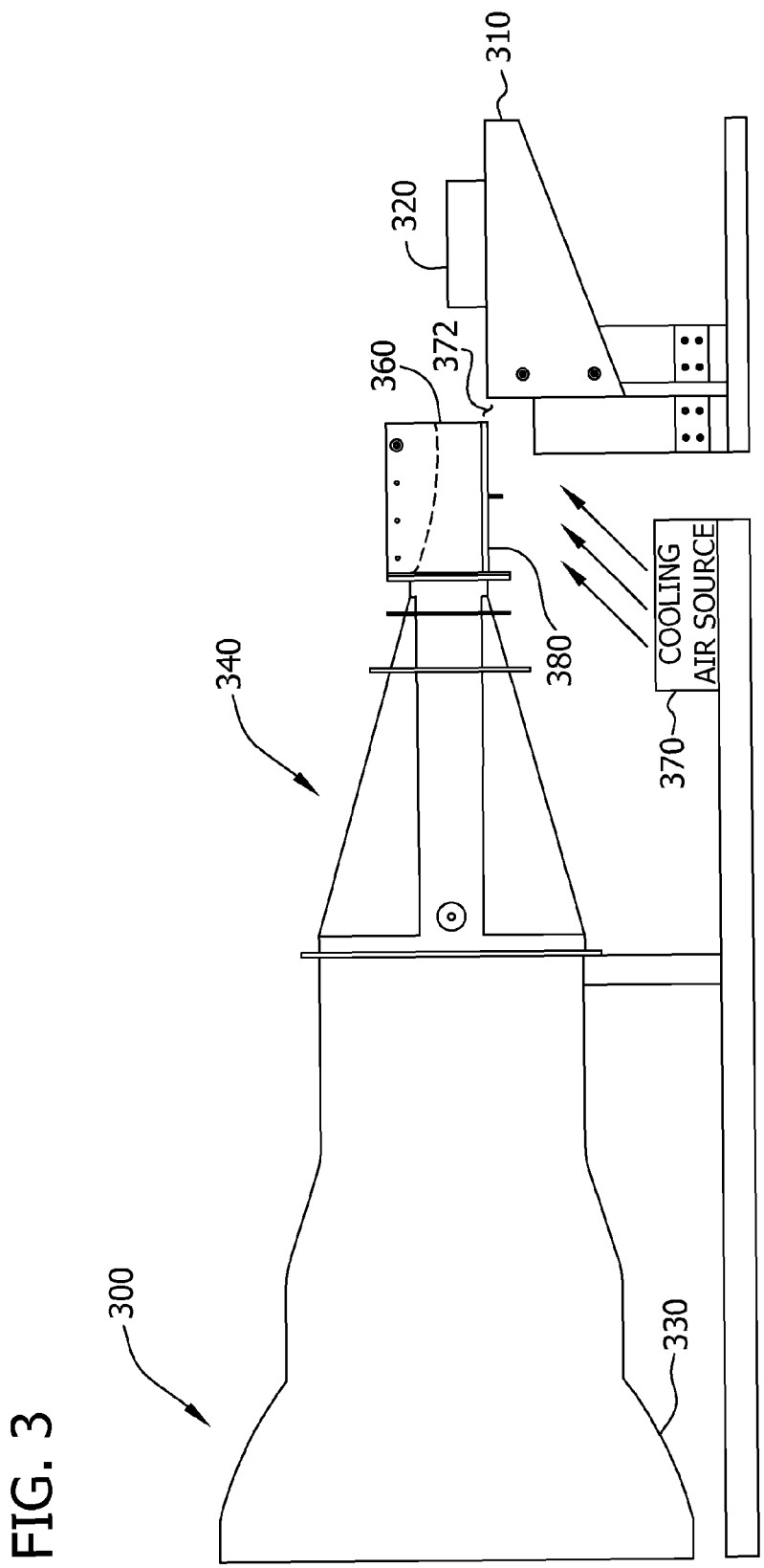
FIG. 3 is a block diagram of a laboratory test system for creating a simultaneous, extreme acoustic, thermal and airflow environment.

Turning now to FIG. 3, a system 300 for simultaneously creating severe acoustic, thermal and airflow environmental conditions is illustrated. System 300 includes a jig 310 for mounting a test article 320, a modified jet engine 330 and a nozzle 340 attached to the jet engine 330 for directing an exhaust of jet engine 330 towards the test article 320. The jig 310 is operable for maintaining a position of the test article 320 with respect to the nozzle. In one embodiment, nozzle 340 is configured to have a rectangular opening 360 and therefore create a substantially two dimensional flow across the test article 320.

In one embodiment, the nozzle 340 is fitted with additional internal flow conditioning components, the purpose of which is to further tailor the properties of the essentially two-dimensional exhaust flow exiting the jet engine 330. As an example, flow conditioning components are added and removed as necessary to increase or delete "swirl" from the exhaust flow.

In one embodiment the system 300 includes a cooling air source 370 which is generally configured to force cooling air through a slot 372 defined by the space between nozzle 340 and the jig 310 on which the test article 320 is (or will be) mounted. In other embodiments, cooling air may be directed up through a bottom 380 of nozzle 340 so that the cooling air combines with the jet exhaust before the combination exits nozzle 340. In other embodiments, the cooling air may be routed through one or more holes formed within a top surface of the jig 310. Though not shown in FIG. 3, ducting may be utilized to direct the cooling air to any or all of the above described destinations.

As mentioned above, system 300 utilizes a modified jet engine 330 and a specially configured exhaust nozzle 340 to generate severe acoustic, thermal and supersonic airflow impingement environments across the jig 310 in a controlled laboratory setting. As such, system 300 is capable of performing development and certification tests for advanced/proprietary/classified structural components, materials and coatings, any of which may be exposed to these three extreme conditions in their intended applications. One example of such an item is an advanced air vehicle engine exhaust system.

System 300 provides a laboratory test capability which is currently not available as no known laboratory solution which combines all three severe environments—acoustic, thermal and high speed airflow. Some of the advantages associated with system 300 are that it combines all three severe acoustic, thermal and airflow impinging environments, it is relatively inexpensive and uncomplicated compared with possible wind tunnel and air/space vehicle options. Setup of system 300 is easily changed to support parametric evaluations using multiple test article configurations, and laboratory setting allows close control of test conditions and is easily converted to a closed area for proprietary projects.

As mentioned above, system 300 utilizes a modified jet engine 330 and specially configured exhaust nozzle 340 to generate severe acoustic, thermal and supersonic airflow impingement environments. With regard to the environments system is capable of generating, an acoustic environment in excess of 170 dB may be generated, as well as a thermal environment on the order of 1,000 degrees Fahrenheit, along with a supersonic airflow environment, (i.e., gas velocities slightly exceeding Mach 1.0), the combination of which may be utilized during test evaluations of structural components, materials and coatings.

Figure 4:
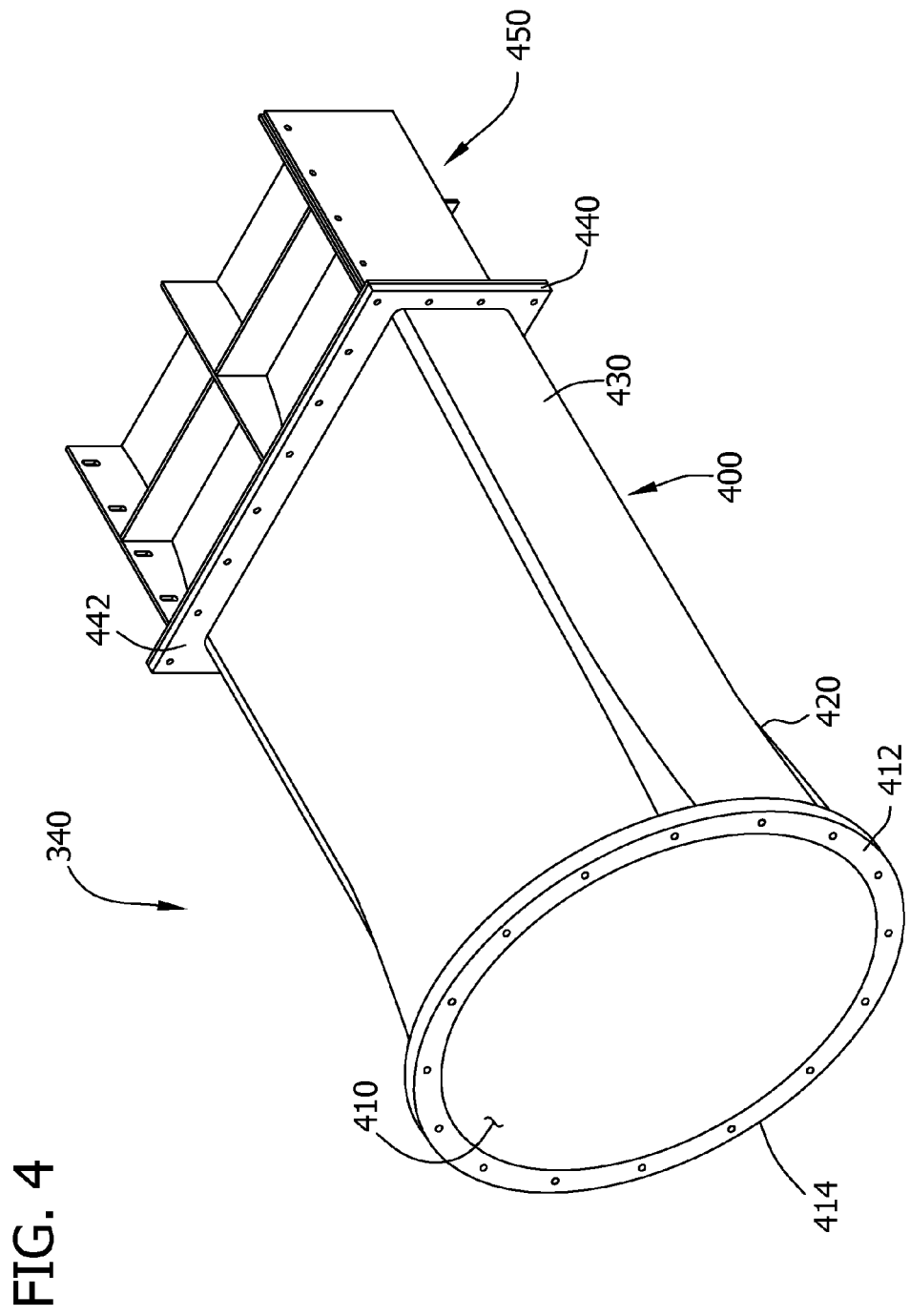
FIG. 4 is an illustration of a nozzle associated with the test system of FIG. 3, detailing a transition assembly.

FIG. 4 is a detailed view of nozzle 340 which includes a transition assembly 400 and a nozzle assembly 450. FIG. 4 details transition assembly 400 which includes a round opening 410 defined by a flange 412 that is configured to mate with and attach to jet engine 330. From the round opening 410 and flange 412 at a first end 414 of transition assembly 400, transition assembly 400 transitions from a round cross-section 420 to a rectangular cross-section 430 eventually terminating at second end 440 of transition assembly 400 which also includes a rectangular flange 442 utilized in attaching transition assembly 400 to nozzle assembly 450.

Figure 5:
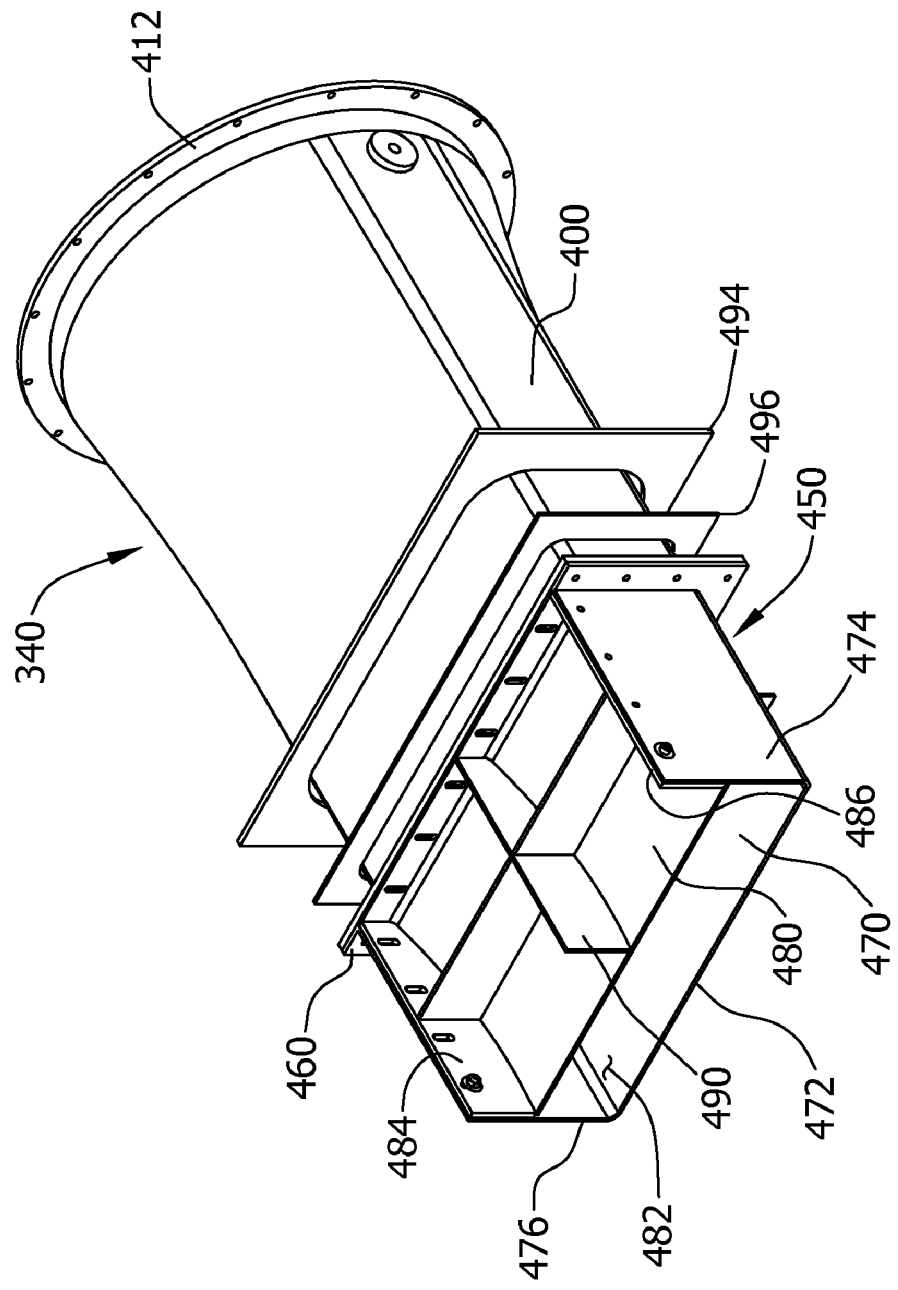
FIG. 5 is an illustration of the nozzle of FIG. 4, detailing a nozzle assembly.
Figure 6:
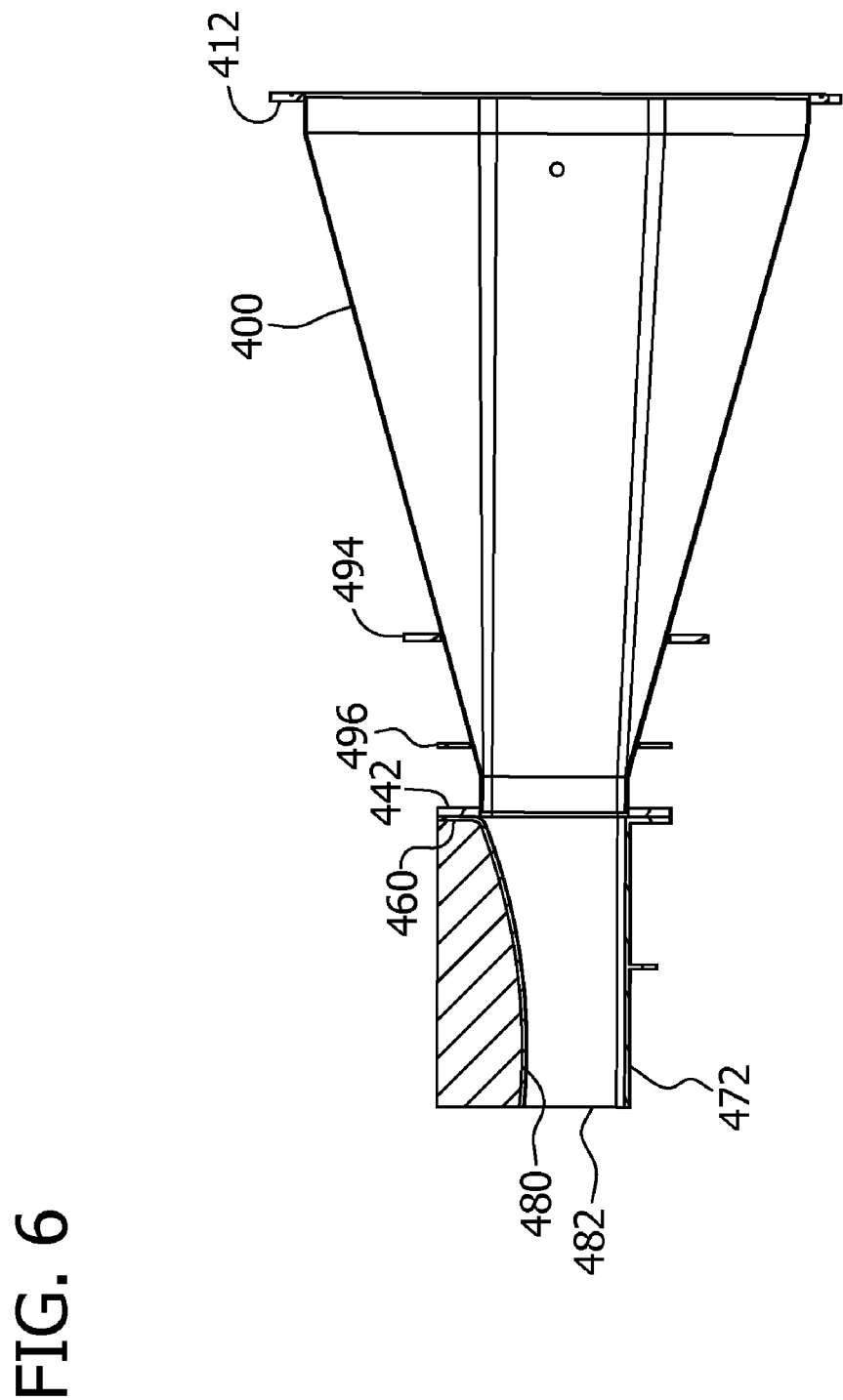
FIG. 6 is a cross-sectional view of the nozzle of FIG. 4.

FIG. 5 is an illustration of the nozzle 340 of FIG. 4, detailing nozzle assembly 450. Nozzle assembly 450 includes a flange 460 which is configured for mating attachment to flange 442 of transition assembly 400. Extending from flange 460 is a generally U-shaped member 470 which defines a bottom 472 and opposing sides 474 and 476 of nozzle assembly 450. Mounted between sides 474 and 476 is an arcuate member 480 which forms the top of nozzle assembly 450. The arcuate shape further defines the exhaust flow is it transitions from the transition assembly 400 and through the nozzle assembly 450. In the illustrated embodiment, exhaust flow is substantially two dimensional through the rectangular opening 482 opposite flange 460. In alternative embodiments, arcuate member 480 may be in a different position such that rectangular opening 482 is larger, smaller, or adjustable in nature. In the illustrated embodiment, arcuate member 480 includes side flanges 484 and 486 to enable attachment to respective sides 474 and 476. In other embodiments, arcuate member 480 may have a different radius of curvature or profile. Finally, arcuate member 480 may incorporate one or more stress ribs 490 extending therefrom to provide the strength needed to operate in the harsh jet engine exhaust environment. As shown in FIG. 5, transition assembly 400 may include one or more stress ribs 494, 496 as well. In the illustrated embodiment, stress ribs 494, 496 extend around the perimeter of transition assembly 400, though other embodiments may be incorporated. FIG. 6 is a cross-sectional view of the nozzle 340 of FIGS. 4 and 5 and better illustrates the arcuate shape of arcuate member 480.

Figure 7:
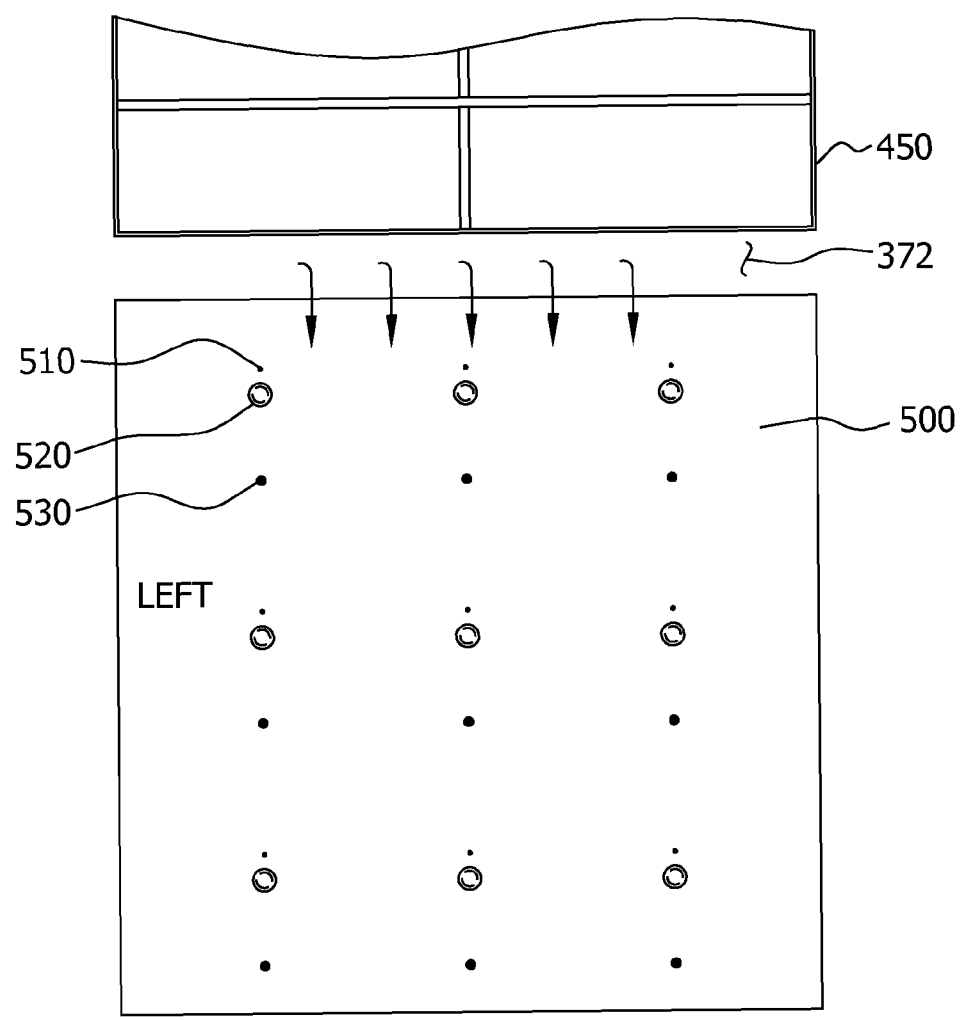
FIG. 7 is a top view of a calibration plate associated with a test jig portion of the test system of FIG. 3.

FIG. 7 is a top view of a calibration plate 500 associated with the test jig 310 associated with the test system of FIG. 3. Articles under test, for example test article 320, are generally mounted to calibration plate 500. Calibration plate 500 includes a plurality of pressure ports 510, acoustic transducers 520, and thermal sensors 530. Examples of devices associated with pressure ports 510 include strain gauge and piezoelectric pressure sensors. Examples of devices associated with acoustic transducers 520 include water cooled microphones, for example. Examples of devices associated with thermal sensors 530 include thermocouples and infrared cameras.

As described above, the two dimensional nozzle assembly 450 and calibration plate 500 may also be positioned a distance apart to define one or more air flow slots 372 (also shown in FIG. 3) through which conditioned "cooling" air may be provided, if the temperature resulting from exposure to the jet engine exhaust is higher than desired for a specific environmental test. Conditioned air may be provided at various temperatures and velocities in order to provide the desired cooling response. In one embodiment, the cooling air is directed through the air flow slot 372 where it joins the two dimensional air flow exiting exhaust nozzle assembly 450.

The embodiments associated with test system 300 allow entities to pursue new structural, material and coating concepts, which are exposed to severe acoustic, thermal and airflow environments in planned use, by providing a relatively inexpensive and simple process to minimize development risk and provide certification demonstrations. The embodiments benefit these entities by having an in-house, readily accessible, closed area capability to evaluate critical performance and risk factors for advanced structural, material and coating concepts. Data from such developmental tests is very useful in applications sensitive to severe acoustic, thermal and airflow environments. As such, entities engaged in development of advanced structure, materials and coatings are able to leverage off the described capabilities to speed development and provide substantiating data. End users benefit through access to test data on advanced concepts which is credible and will provide a lower risk decision in going forward with designs that implement the concepts tested using test system 300.

This written description uses examples to disclose various embodiments, which include the best mode, to enable any person skilled in the art to practice those embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A system for simultaneously creating severe acoustic, thermal and airflow environmental conditions, said system comprising:
   a jig for mounting a test article;
   a jet engine; and
   a nozzle attached to said jet engine, said nozzle comprising an opening for defining a two dimensional exhaust flow from said jet engine to create an acoustical, thermal and airflow environment across the test article, said jig operable for maintaining a position of the test article with respect to said nozzle.

2. A system according to claim 1 wherein said nozzle comprises:
   a generally U-shaped member which defines a bottom and opposing sides of said nozzle; and
   an arcuate member which forms a top of said nozzle, said arcuate member attached to the opposing sides, said arcuate member defining a portion of the two dimensional exhaust flow from said jet engine.

3. A system according to claim 2 wherein said arcuate member is adjustable with respect to said generally U-shaped member.

4. A system according to claim 1 wherein said nozzle comprises:
   a nozzle assembly; and
   a transition assembly, said transition assembly comprising:
      a round flange defining a round opening at a first end, said round flange configured for attachment to said jet engine;
      a rectangular flange defining a rectangular opening at a second end, said rectangular flange configured for attachment to said nozzle assembly; and
      a body extending between said flanges, said body transitioning from a round cross-section at the first end to a rectangular cross-section at the second end.

5. A system according to claim 4 wherein said round flange is configured for engagement with said jet engine.

6. A system according to claim 4 wherein said nozzle assembly comprises:
   a rectangular flange for attachment to said rectangular flange of said transition assembly;
   a generally U-shaped member extending from said rectangular flange which defines a bottom and opposing sides of said nozzle assembly; and
   an arcuate member which forms a top of said nozzle assembly, said arcuate member attached to the opposing sides, said arcuate member defining a portion of the two dimensional exhaust flow from said jet engine.

7. A system according to claim 6 wherein said arcuate member is adjustable with respect to said generally U-shaped member.

8. A system according to claim 6 wherein said arcuate member comprises side flanges extending therefrom, said side flanges operable for attaching said arcuate member to the opposing sides of said transition assembly.

9. A system according to claim 6 wherein said arcuate member comprises at least one stress rib extending from a top surface of said arcuate member.

10. A system according to claim 4 wherein said transition assembly comprises at least one stress rib extending from a surface thereof.

11. A system according to claim 10 wherein said at least one stress rib extends about a perimeter of said transition assembly.

12. A system according to claim 1 wherein said jig comprises a calibration plate affixed to said jig such that the two dimensional exhaust flow from said jet engine flows across said calibration plate and any test articles attached thereto, said calibration plate further comprising at least one of a pressure port, an acoustic transducer, and a thermal sensor attached thereto.

13. A system according to claim 1 wherein said jig comprises a calibration plate affixed to said jig such that the two dimensional exhaust flow from said jet engine flows across said calibration plate and any test articles attached thereto, said calibration plate further comprising at least one air flow port through which cooling air may be provided to any test articles attached thereto.

14. A method for placing a test article into a severe acoustic, thermal and airflow environment, said method comprising:
 placing the test article onto a jig;
 aligning the test article with a nozzle attached to a jet engine, the nozzle having an opening for defining a two dimensional exhaust flow from the jet engine; and
 operating the jet engine to create the desired severe acoustical, thermal and airflow environment about the test article.

15. A method according to claim 14 wherein operating the jet engine to create the desired environment comprising directing the exhaust flow through a generally U-shaped member which defines a bottom and opposing sides of said nozzle and an arcuate member which forms a top of the nozzle such that the arcuate member defines a portion of the two dimensional exhaust flow from the jet engine.

16. A method according to claim 14 further comprising directing cooling air through at least one air flow port formed in the jig and onto the test article.

17. An assembly for directing an exhaust flow from a jet engine, said assembly comprising:
 a transition assembly comprising a body extending between a first end and a second end, said body transitioning from a round cross-section at the first end configured for attachment to a jet engine to a rectangular cross-section at the second end; and
 a nozzle assembly comprising:
  a rectangular flange for attachment to the rectangular cross section of said transition assembly;
  a generally U-shaped member extending from said rectangular flange which defines a bottom and opposing sides of said nozzle assembly; and
  a member defining an arcuate surface which forms a top of said nozzle assembly, said member attached to the opposing sides, said arcuate surface defining a portion of the two dimensional exhaust flow from said jet engine.

18. An assembly according to claim 17 wherein said transition assembly comprises round flange at the first end configured for engagement with a jet engine at a location from which a power turbine has been removed.

19. An assembly according to claim 17 wherein said member is adjustable with respect to said generally U-shaped member to further define the two dimensional exhaust flow.

20. An assembly according to claim 17 wherein said transition assembly comprises:
 a round flange defining a round opening at the first end, said round flange configured for the attachment to the jet engine; and
 a rectangular flange defining a rectangular opening at the second end, said rectangular flange operable for coupling to said rectangular flange of said nozzle assembly.

* * * * *